(12) United States Patent
Kim et al.

(10) Patent No.: US 12,119,542 B2
(45) Date of Patent: Oct. 15, 2024

(54) MOBILE DEVICE WITH ANTENNA ARRAY

(71) Applicant: Samsung Electronics Co., Ltd., Gyeonggi-do (KR)

(72) Inventors: Jihoon Kim, Gyeonggi-do (KR); Hyoseok Na, Gyeonggi-do (KR); Jongin Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 431 days.

(21) Appl. No.: 17/297,868

(22) PCT Filed: Dec. 5, 2019

(86) PCT No.: PCT/KR2019/017120
§ 371 (c)(1),
(2) Date: May 27, 2021

(87) PCT Pub. No.: WO2020/116968
PCT Pub. Date: Jun. 11, 2020

(65) Prior Publication Data
US 2022/0037763 A1 Feb. 3, 2022

(30) Foreign Application Priority Data
Dec. 5, 2018 (KR) .................. 10-2018-0155141

(51) Int. Cl.
*H01Q 1/24* (2006.01)
*H01Q 1/38* (2006.01)
*H01Q 21/06* (2006.01)

(52) U.S. Cl.
CPC .............. *H01Q 1/243* (2013.01); *H01Q 1/38* (2013.01); *H01Q 21/06* (2013.01)

(58) Field of Classification Search
CPC .......... H01Q 1/243; H01Q 1/38; H01Q 3/267; H01Q 9/26; H01Q 21/0087; H01Q 21/06;
(Continued)

(56) References Cited

U.S. PATENT DOCUMENTS 7,138,949 B1* 11/2006 Ryken, Jr. ............ H01Q 9/0407
343/700 MS
8,836,587 B2 9/2014 Darnell et al.
(Continued)

FOREIGN PATENT DOCUMENTS

CN 105990652 10/2016
CN 207459171 6/2018
(Continued)

OTHER PUBLICATIONS

Korean Office Action dated Dec. 20, 2022 issued in counterpart application No. 10-2018-0155141, 14 pages.
(Continued)

*Primary Examiner* — Raymond R Chai
(74) *Attorney, Agent, or Firm* — The Farrell Law Firm, P.C.

(57) ABSTRACT

An electronic device according to an embodiment disclosed herein includes a housing and a plurality of antenna modules disposed adjacent to an edge of the housing, wherein the plurality of antenna modules may include: a first antenna array including a printed circuit board, which includes a first face, a second face facing away from the first face, and a side face disposed between the first face and the second face, and a plurality of first antenna elements extending from a point on the first face to a point on the second face through the side face; and a second antenna array including a plurality of second antenna elements disposed on the first face. In addition, various embodiments conceived through the specification are possible.

9 Claims, 15 Drawing Sheets

(58) Field of Classification Search
CPC ...... H01Q 21/065; H01Q 21/08; H01Q 21/28; H01Q 21/30; H04M 1/026
See application file for complete search history.

(56) References Cited

U.S. PATENT DOCUMENTS

| | | | |
|---|---|---|---|
| 9,502,752 | B2 | 11/2016 | Darnell et al. |
| 9,705,180 | B2 | 7/2017 | Darnell et al. |
| 9,799,959 | B2 | 10/2017 | Ko et al. |
| 9,806,422 | B2 | 10/2017 | Garcia et al. |
| 9,923,261 | B2 | 3/2018 | Jin et al. |
| 9,972,892 | B2 | 5/2018 | Noori et al. |
| 9,984,985 | B1 | 5/2018 | Chiang et al. |
| 10,170,838 | B2 | 1/2019 | Garcia et al. |
| 10,297,900 | B2 | 5/2019 | Lee et al. |
| 10,305,172 | B2 | 5/2019 | Noori et al. |
| 10,530,066 | B2 | 1/2020 | Lee et al. |
| 10,637,127 | B2 | 4/2020 | Ryu et al. |
| 10,693,216 | B1 | 6/2020 | Ryu et al. |
| 10,879,590 | B2 * | 12/2020 | Li ........................... H01Q 1/48 |
| 10,965,030 | B2 * | 3/2021 | Han ....................... H01Q 1/243 |
| 11,223,104 | B2 | 1/2022 | Lee et al. |
| 11,355,831 | B2 | 6/2022 | Xia et al. |
| RE49,261 | E | 10/2022 | Jin et al. |
| 2002/0122006 | A1 | 9/2002 | Crawford |
| 2006/0114166 | A1 | 6/2006 | Mohammadian et al. |
| 2008/0106471 | A1 | 5/2008 | Yeh |
| 2008/0150823 | A1 | 6/2008 | Mohammadian et al. |
| 2011/0080330 | A1 | 4/2011 | Lee et al. |
| 2013/0257668 | A1 * | 10/2013 | Rao ....................... H01Q 21/28 |
| | | | 343/893 |
| 2014/0306846 | A1 | 10/2014 | Nakatsu et al. |
| 2017/0062907 | A1 | 3/2017 | Kim et al. |
| 2017/0317418 | A1 | 11/2017 | Garcia et al. |
| 2018/0090816 | A1 | 5/2018 | Mow et al. |
| 2018/0151947 | A1 * | 5/2018 | Apostolos ............ H01Q 1/2291 |
| 2019/0173160 | A1 | 6/2019 | Mow et al. |
| 2019/0229405 | A1 | 7/2019 | Xia et al. |
| 2019/0273308 | A1 | 9/2019 | Lee et al. |
| 2019/0319342 | A1 | 10/2019 | Apostolas et al. |
| 2020/0144711 | A1 | 5/2020 | Lee et al. |
| 2020/0176862 | A1 * | 6/2020 | Chen ........................ H01Q 9/06 |
| 2021/0297514 | A1 * | 9/2021 | Jang ....................... H01Q 21/08 |

FOREIGN PATENT DOCUMENTS

| | | |
|---|---|---|
| CN | 108376828 | 8/2018 |
| CN | 108432041 | 8/2018 |
| KR | 10-2016-0016465 | 2/2016 |
| KR | 10-2017-0082799 | 7/2017 |
| KR | 10-2017-0087753 | 7/2017 |
| WO | WO 2018084327 | 5/2018 |

OTHER PUBLICATIONS

European Notice of Allowance dated May 8, 2023 issued in counterpart application No. 19892405.2-1205, 73 pages.
European Search Report dated Mar. 15, 2022 issued in counterpart application No. 19892405.2-1205, 17 pages.
European Search Report dated Nov. 26, 2021 issued in counterpart application No. 19892405.2-1205, 14 pages.
PCT/ISA/210 Search Report issued on PCT/KR2019/017120, Apr. 3, 2020, pp. 5.
PCT/ISA/237 Written Opinion issued on PCT/KR2019/017120, Apr. 3, 2020, pp. 6.
Chinese Office Action dated Dec. 1, 2023 Issued in counterpart application No. 201980079751.8, 12 pages.
Chinese Office Action dated May 8, 2024 issued in counterpart application No. 201980079751.8, 7 pages.

* cited by examiner

MOBILE DEVICE WITH ANTENNA ARRAY

PRIORITY

This application is a National Phase Entry of PCT International Application No. PCT/KR2019/017120, which was filed on Dec. 5, 2019, and claims priority to Korean Patent Application No. 10-2018-0155141, which was filed on Dec. 5, 2018, the entire content of each of which is incorporated herein by reference.

TECHNICAL FIELD

Embodiments of the disclosure relate to a technology to reduce the size of an antenna module.

BACKGROUND ART

Recently, as an electronic device is popularized, network traffic is rapidly increased due to the electronic device (e.g., a smartphone). To overcome the problem related to the network traffic, studies and researches have been actively performed on a next generation mobile communication technology, for example, a fifth generation (5G) mobile communication technology employing a signal in an ultra-high frequency band. When the 5G mobile communication technology is employed, a bandwidth may be more widely used, so a larger amount of information may be transmitted or received.

To employ the 5G mobile communication technology, the electronic device may include an antenna module in which an antenna array is disposed. The antenna array has effective isotropically radiated power (EIRP) higher than that of one antenna. Accordingly, the antenna array may transmit or receive various types of data.

DISCLOSURE

Technical Problem

However, the antenna module may have a considerable large size, when considering the mounting space of the electronic device. In particular, the size of the antenna module may be increased due to a dipole antenna array mounted in a side surface of the antenna module. When the size of the antenna module is increased, the thickness of the electronic device may be increased, which makes it difficult for a user to carry the electronic device.

Aspects of the disclosure are to provide an electronic device capable of addressing at least the above-mentioned problems and/or objects suggested in the disclosure.

Technical Solution

According to an embodiment of the disclosure, an electronic device may include a housing, and a plurality of antenna modules disposed to be adjacent to an edge of the housing. The plurality of antenna modules may include a printed circuit board including a first surface, a second surface opposite to the first surface, and a side surface between the first surface and the second surface, a first antenna array including a plurality of first antenna elements extending from a point on the first surface to a point on the second surface through the side surface, a second antenna array disposed on the first surface and including a plurality of second antenna elements, a power feeding line extending from the first antenna array and the second antenna array, and a communication circuit electrically connected with the power feeding line and configured to transmit and receive a signal in a specified frequency band by using the first antenna array and the second antenna array. The plurality of first antenna elements may be plated on the printed circuit board.

According to an embodiment of the disclosure, an electronic device may include a housing and a plurality of antenna modules disposed to be adjacent to an edge of the housing. The plurality of antenna modules may include a printed circuit board including a first area and a second area extending from the first area, a first antenna array disposed inside the first area, a second antenna array disposed on a surface of the second area, a director plated to surround the first antenna array on the first area, a power feeding line extending from the first antenna array and the second antenna array, and a communication circuit electrically connected with the power feeding line and configured to transmit or receive a signal in a specified frequency band by using the first antenna array and the second antenna array.

According to an embodiment of the disclosure, an antenna module may include a printed circuit board, a first patch antenna and a second patch antenna formed on one surface of the printed circuit board, a communication circuit disposed on the one surface or another surface of the printed circuit board, a first signal line and a second signal line formed inside the printed circuit board while being electrically connected with the communication circuit, and at least partially exposed to an outside through a side surface of the printed circuit board, and a first conductive member coated on the side surface to make contact with the first signal line, and a second conductive member coated on the side surface to make contact with the second signal line.

Advantageous Effects

According to embodiments of the disclosure, the size of the antenna module may be decreased. In addition, according to embodiments of the disclosure, the radiation performance of the antenna module may be improved.

Besides, various effects may be provided that are directly or indirectly identified through the disclosure.

MODE FOR INVENTION

Figure 1:
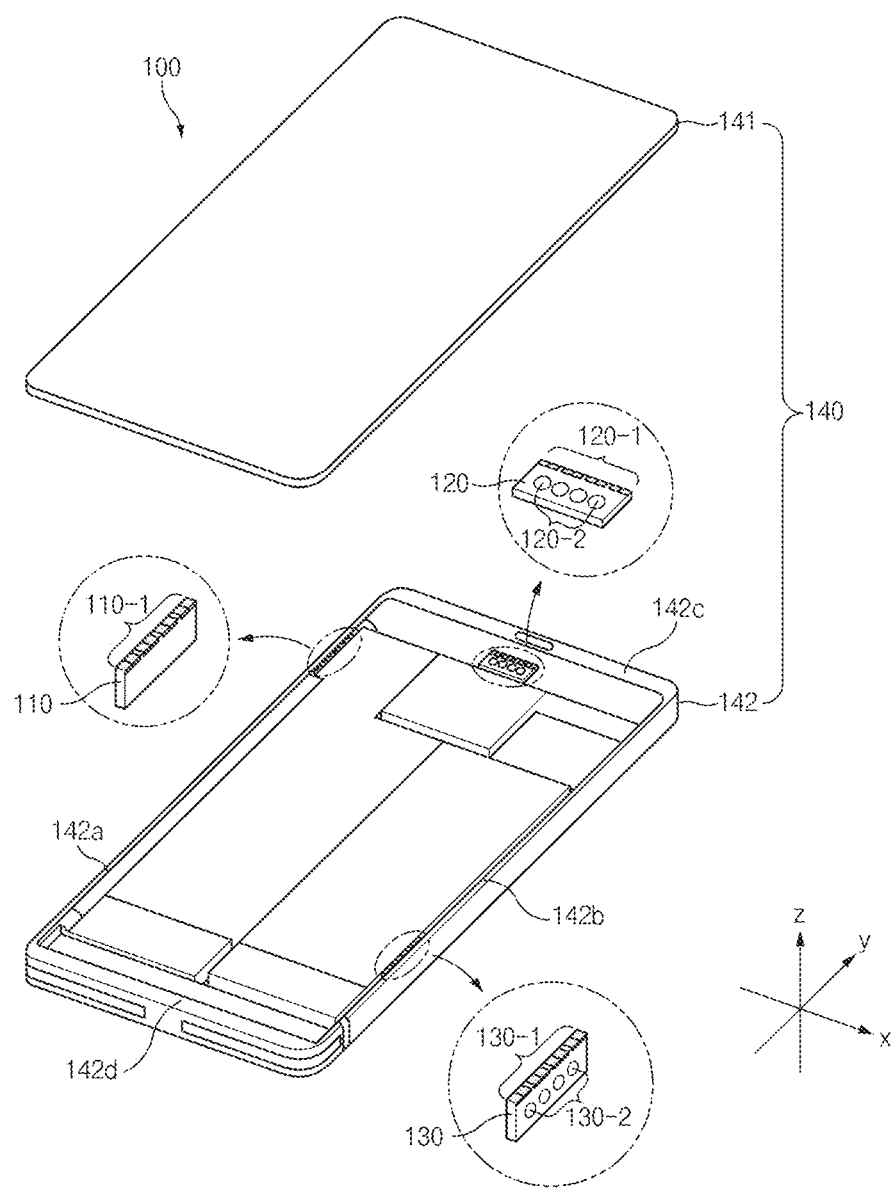
FIG. 1 illustrates an exploded perspective view of an electronic device, according to an embodiment.

FIG. 1 illustrates an exploded perspective view of an electronic device, according to an embodiment.

Referring to FIG. 1, an electronic device 100 may include a housing 140 and a plurality of antenna modules 110, 120, and 130.

The housing 140 may include a rear cover 141 and a side member 142. The rear cover 141 is coupled to the side member 142 to form an outer appearance of the electronic device 100. The side member 142 may protect various components from an external impact, and a portion of the side member 142 may operate as an antenna radiator.

The plurality of antenna modules 110, 120, and 130 may include the first antenna module 110, the second antenna module 120, and the third antenna module 130. The first antenna module 110, the second antenna module 120, and the third antenna module 130 may be disposed at areas adjacent to edges 142a, 142b, 142c, and 142d of the housing 140 or may be attached to the edges 142a, 142b, 142c, and 142d of the housing 140.

The plurality of antenna modules 110, 120, and 130 may include first antenna arrays 110-1, 120-1, and 130-1 and second antenna arrays 120-2 and 130-2. According to an embodiment, the first antenna arrays 110-1, 120-1, and 130-1 may plated, in the shape of "U", with gold on side surfaces of the antenna modules 110, 120, and 130. The antenna modules 110, 120, and 130 may transmit or receive a signal in a specified frequency band (e.g., about 28 GHz) by feeding power into the first antenna arrays 110-1, 120-1, and 130-1, and the first antenna arrays 110-1, 120-1, and 130-1 may operate as dipole antenna arrays. In the disclosure, the gold plating may be referred to "coating" or "plating". According to an embodiment, the first antenna arrays 110-1, 120-1, and 130-1 may be formed by plating, in the shape of "U", the side surfaces of the antenna modules 110, 120, and 130 with copper (Cu).

According to a comparative example, an antenna module may have a dipole antenna array mounted in the antenna module. To mount the dipole antenna array, the antenna module may include a specific space including a nonconductor, and the size of the antenna module may be increased due to the specific space. When the size of the antenna module is increased, the thickness of the electronic device may be increased, which makes it difficult for a user to carry the electronic device. However, according to an embodiment of the disclosure, the specific space is etched and the first antenna arrays 110-1, 120-1, and 130-1 may be plated with gold at the etched space. In this case, the size of the antenna module may be decreased, and the thickness of the electronic device 100 may be decreased.

The second antenna arrays 120-2 and 130-2 may include a plurality of patch antenna elements. Each of the antenna modules 110, 120, and 130 may transmit and receive a signal in a specified frequency band (e.g., about 28 GHz) by feeding power into the second antenna arrays 120-2 and 130-2.

According to an embodiment, the first antenna module 110, the second antenna module 120, and the third antenna module 130 may be attached to mutually different edges of the housing 140 or may be disposed in areas adjacent to the mutually different edges. For example, the housing 140 may include the first edge 142a, the second edge 142b parallel to the first edge 142a, and the third edge 142c to connect one end of the first edge 142a with one end of the second edge 142b, and the fourth edge 142d to connect an opposite end of the first edge 142a with an opposite end of the second edge 142b. The first antenna module 110 may be disposed in an area adjacent to the first edge 142a or may be attached to the first edge 142a. The second antenna module 120 may be disposed in an area adjacent to the third edge 142c or may be attached to the third edge 142c. The third antenna module 130 may be disposed in an area adjacent to the second edge 142b or may be attached to the second edge 142b.

According to an embodiment, the first antenna module 110, the second antenna module 120, and the third antenna module 130 may face mutually different directions. For example, the first antenna module 110 may be disposed such that the first antenna array 110-1 faces a z direction, and the second antenna array 110-2 (in FIG. 2) faces a −x direction. The second antenna module 120 may be disposed such that the second antenna array 120-2 faces the z direction, and the first antenna array 120-1 faces a y direction. The third antenna module 130 may be disposed such that the first antenna array 130-1 faces the z direction, and the second antenna array 130-2 faces an x axis direction According to an embodiment, the antenna modules 110, 120, and 130 may transmit or receive a signal in a specified direction by using the first antenna arrays 110-1, 120-1, and 130-1 and the second antenna arrays 110-1, 120-2, and 130-2. For example, the first antenna module 110 may transmit and receive a signal in the z direction through the first antenna array 110-1. The first antenna module 110 may transmit and receive a signal in the −x direction through the second antenna array 110-2 (110-2 in FIG. 2).

According to the disclosure, the embodiment illustrated in FIG. 1 is provided for the illustrative purpose, and various embodiments of the disclosure are not limited to that illustrated in FIG. 1. For example, the electronic device 100 may further include components other than components illustrated in FIG. 1, and may not include some of the components illustrated in FIG. 1. In addition, according to the disclosure, components having the same reference numerals as those of the components illustrated in FIG. 1 may be applied with the same description as that made with reference to FIG. 1.

Figure 2:
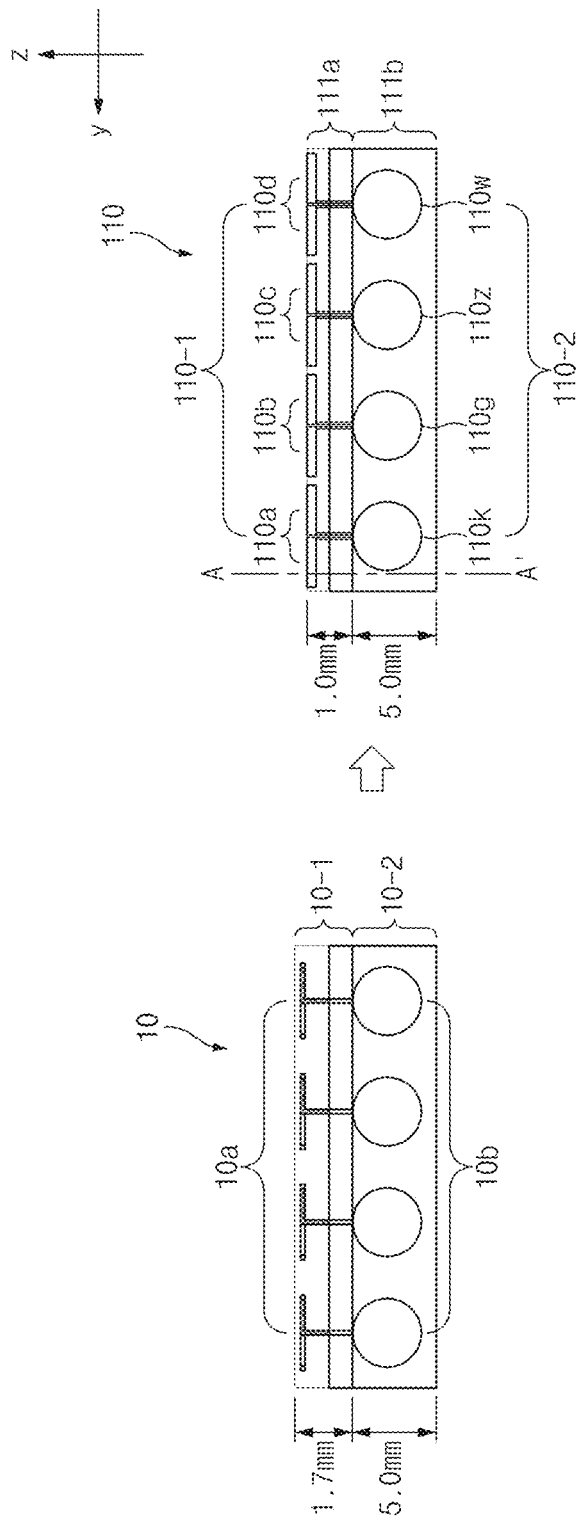
FIG. 2 illustrates an antenna module according to a comparative example and an antenna module according to an embodiment of the disclosure.

FIG. 2 illustrates an antenna module according to a comparative example and an antenna module according to an embodiment of the disclosure. Although the following description will be made while focusing on the first antenna module 110 for the convenience of understanding, the description of the first antenna module 110 may be identically applied to the second antenna module 120 and the third antenna module 130.

Referring to FIG. 2, an antenna module 10 according to the comparative example may include a first area 10-1 and a second area 10-2. The first area 10-1 is an area to mount a dipole antenna array 10a, and at least a portion of the first area 10-1 may include a non-conductor (e.g., plastic). The second area 10-2 is an area to mount a patch antenna array 10b, and a conductive layer and various wires may be disposed in the second area 10-2. According to the comparative example, as the antenna module 10 includes the first area 10-1, the size of the antenna module 10 may be increased. When the size of the antenna module 10 is increased, the thickness of the electronic device may be increased, which makes it difficult for a user to carry the electronic device.

However, according to an embodiment of the disclosure, in the first antenna module 110, the dipole antenna array 10a is implemented to be in a different form (e.g., a plated form), so the size of the first antenna module 110 may become smaller than that of the antenna module 10 according to the comparative example. For example, first antenna elements 110a, 110b, 110c, and 110d in the shape of "U" may be plated with gold on the side surface of the first antenna module 110. The length (of about 1.0 mm) of an a-th area 111a having the first antenna elements 110a, 110b, 110c, and 110d plated with gold may be shorter than the length (of about 1.7 mm) of the first area 10-1. Accordingly, the length of the first area 10-1 may be decreased (e.g., by 40% or more), and the thickness of the electronic device 100 may be decreased. According to the disclosure, the first antenna elements 110a, 110b, 110c, and 110d may be referred to as conductive members.

According to an embodiment, the first antenna elements 110a, 110b, 110c, and 110d may constitute the first antenna array 110-1. The first antenna array 110-1 may operate as the dipole antenna array 10a. For example, the first antenna module 110 may transmit and receive a signal in the z direction by feeding power into the first antenna array 110-1.

For another example, the first antenna module 110 may transmit and receive a signal in the −x direction by feeding power into the second antenna array 110-2. The second antenna array 110-2, which is an antenna array including a plurality of patch antenna elements 110k, 110g, 110z, 110w (or second antenna elements), may radiate a signal in a direction perpendicular to the direction of the signal transmitted or received by the first antenna array 110-1.

Figure 3:
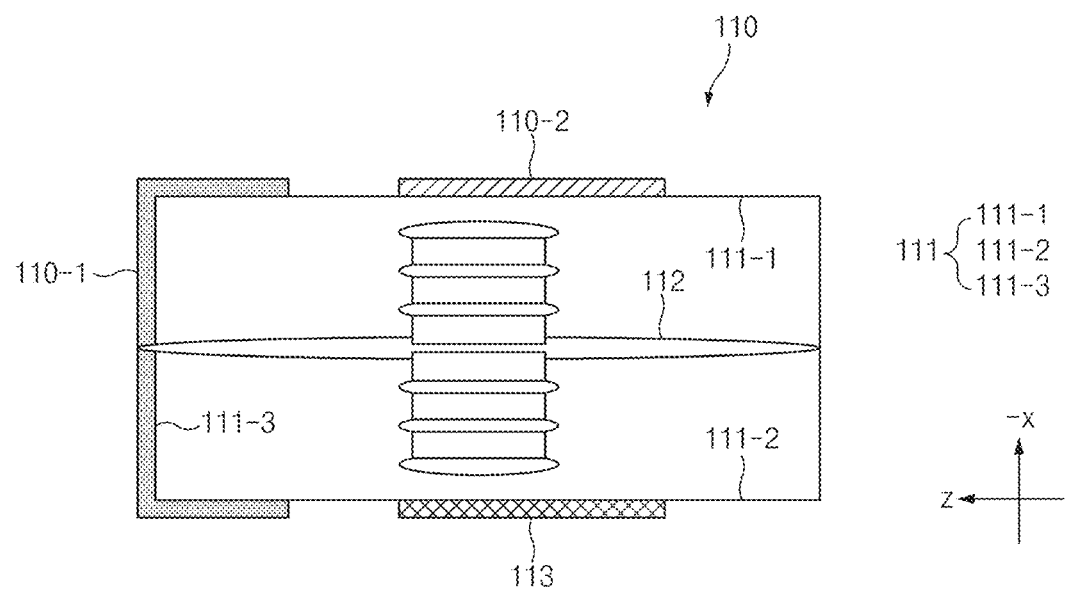
FIG. 3 illustrates a cross-sectional view of a first antenna module, according to an embodiment.

FIG. 3 illustrates a cross-sectional view of a first antenna module, according to an embodiment. FIG. 3 is a cross-sectional view taken along line A-A' of the first antenna module 110 of FIG. 2.

Referring to FIG. 3, the first antenna module 110 may include a printed circuit board 111, the first antenna array 110-1, the second antenna array 110-2, a power feeding line 112, and a communication circuit 113.

The printed circuit board 111 may include a first surface 111-1, a second surface 111-2 opposite to the first surface 111-1, and a side surface 111-3 between the first surface 111-1 and the second surface 111-2. For example, the first surface 111-1, the second surface 111-2, and the side surface 111-3 may form an outer appearance of the printed circuit board 111.

The first antenna array 110-1 may extend from a point on the first surface 111-1 to a point on the second surface 111-2 through the side surface 111-3. For example, the first antenna array 110-1 may extend along an outer portion of the printed circuit board 111 from the point on the first surface 111-1 to the point on the second surface 111-2. For example, the first antenna array 110-1 may be formed, as gold (Au) is plated from the point on the first surface 111-1 to the point on the second surface 111-2 through the side surface 111-3.

The second antenna array 110-2 may be disposed on the first surface 111-1. The second antenna array 110-2 may be disposed on the second surface 111-2 or may be disposed inside the printed circuit board 111.

The power feeding line 112 may extend from the first antenna array 110-1 and the second antenna array 110-2 to be electrically connected with the communication circuit 113. In the disclosure, the power feeding line 112 may be referred to as a signal line.

The communication circuit 113 may be disposed on a surface opposite to the surface on which the second antenna array 110-2 is disposed. For example, when the second antenna array 110-2 is disposed on the first surface 111-1, the communication circuit 113 may be disposed on the second surface 111-2. To the contrary, when the second antenna array 110-2 is disposed on the second surface 111-2, the communication circuit 113 may be disposed on the first surface 111-1.

The communication circuit 113 may transmit and receive a signal in a specific direction by feeding power into each of the first antenna array 110-1 and the second antenna array 110-2 through the power feeding line 112. For example, the communication circuit 113 may transmit and receive a signal in the z direction through the first antenna array 110-1 and may transmit and receive a signal in the −x direction through the second antenna array 110-2. In the disclosure, the communication circuit 113 may be referred to as a third radio frequency integrated circuit (RFIC) 1426 of FIG. 14.

Figure 4:
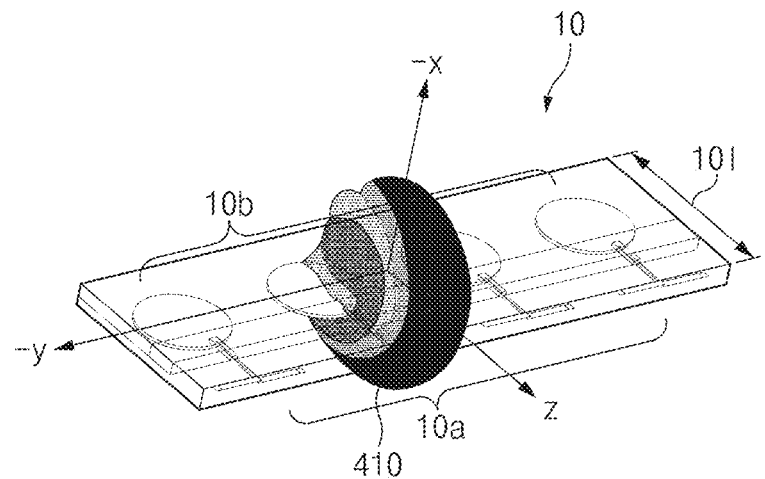
FIG. 4 illustrates a beam pattern of an antenna module according to a comparative example and a beam pattern of a first antenna module according to an embodiment of the disclosure.
Figure 4:
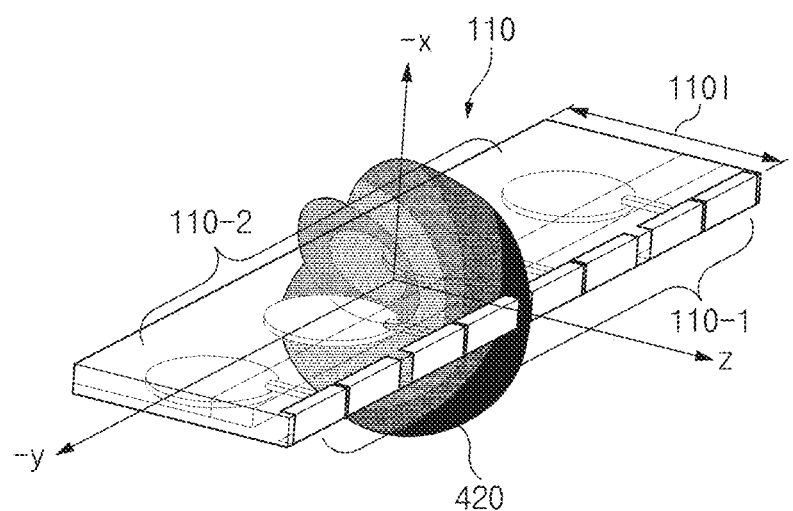

FIG. 4 illustrates a beam pattern of an antenna module according to a comparative example and a beam pattern of a first antenna module according to an embodiment of the disclosure. FIG. 4 is a view illustrating the comparison between the antenna module 10 according to the comparative example and the first antenna module 110 according to an embodiment of the disclosure.

Referring to FIG. 4, the antenna module 10 according to the comparative example may include the dipole antenna array 10a and the patch antenna array 10b. A first beam pattern 410 may be formed by the dipole antenna array 10a and the patch antenna array 10b. A beam pattern formed by the dipole antenna array 10a is formed in the z direction, and a beam pattern formed by the patch antenna array 110b is formed in the −x direction. Accordingly, the first beam pattern 410 may be formed in the z direction and the −x direction.

According to an embodiment of the disclosure, the first antenna module 110 may include the first antenna array 110-1 and the second antenna array 110-2. A second beam pattern 420 may be formed by the first antenna array 110-1 and the second antenna array 110-2. The second beam pattern 420 may be substantially the same as the first beam pattern 410, and the second beam pattern 420 may be formed in the z direction and the −x direction.

When compared the antenna module 10 according to the comparative example with the first antenna module 110 according to an embodiment of the disclosure, a length 110l of the first antenna module 110 may be shorter than a length 10l of the antenna module 10. For example, the first antenna array 110-1 may be plated with gold in the shape of "U" on the side surface of the first antenna module 110, instead of the dipole antenna array 10a. Accordingly, the length 110l (of about 6.0 mm) of the first antenna module 110 may be shorter than the length 10l (of about 6.7 mm) of the antenna module 10.

Although the length 110l of the first antenna module 110 becomes shorter than the length 10l of the antenna module 10, the radiation performance of the first antenna module 110 may be substantially the same as the radiation performance of the antenna module 10. In other words, the first beam pattern 410 and the second beam pattern 420 are substantially the same. Accordingly, it may be understood that the radiation performance of the first antenna module 110 may be substantially the same as the radiation performance of the antenna module 110. According to an embodiment of the disclosure, the first antenna array 110-1 having substantially the same radiation performance as the radiation performance of the dipole antenna array 10a may be implemented by plating gold on the side surface of the first antenna module 110. In addition, according to an embodiment of the disclosure, the size of the first antenna module 110 may be decreased by implementing the dipole antenna array 10a to be in a different form, as the side surface of the first antenna module 110 is plated with gold.

Figure 5A:
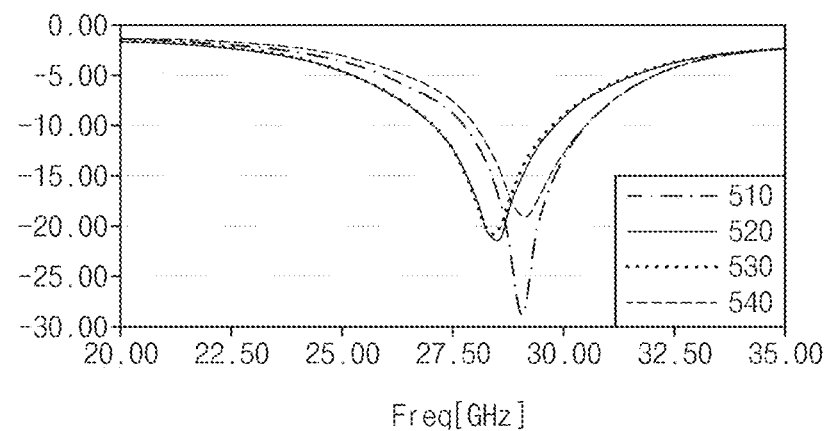
FIG. 5A illustrates a reflection coefficient of a first antenna array, according to an embodiment of the disclosure.

FIG. 5A illustrates a reflection coefficient of a first antenna array, according to an embodiment of the disclosure.

The graphs 510, 520, 530, and 540 illustrated in FIG. 5A represents a reflection coefficient of each of the a-th antenna element 110a, the b-th antenna element 110b, the c-th antenna element 110c, and the d-th antenna element 110d illustrated in FIG. 2, respectively. In other words, the first graph 510 represents the reflection coefficient of the a-th antenna element 110a, the second graph 520 represents the reflection coefficient of the b-th antenna element 110b, the third graph 530 represents the c-th antenna element 110c, and the fourth graph 540 represents the reflection coefficient of the d-th antenna element 110d.

Referring to the first graph 510 to the fourth graph 540, the reflection coefficient of each of the a-th antenna element 110a, the b-th antenna element 110b, the c-th antenna element 110c, and the d-th antenna element 110d may be gradually decreased from about 20 GHz and may have a minimum value at about 28 GHz. In addition, the reflection coefficient of each of the a-th antenna element 110a, the b-th antenna element 110b, the c-th antenna element 110c, and the d-th antenna element 110d may be increased again from about 28 GHz. In other words, the a-th antenna element 110a, the b-th antenna element 110b, the c-th antenna element 110c, and the d-th antenna element 110d may represent the most excellent radiation performance in around 28 GHz.

Although FIG. 5A illustrates that each of the a-th antenna element 110a, the b-th antenna element 110b, the c-th antenna element 110c, and the d-th antenna element 110d represents the most excellent radiation performance in around 28 GHz, various embodiments of the disclosure are not limited to those illustrated in FIG. 5A. For example, the a-th antenna element 110a, the b-th antenna element 110b, the c-th antenna element 110c, and the d-th antenna element 110d may represent the most excellent radiation performance in around 39 GHz or in other frequency bands.

According to an embodiment of the disclosure, the a-th antenna element 110a, the b-th antenna element 110b, the c-th antenna element 110c, and the d-th antenna element 110d may be formed by plating the side surface of the first antenna module with gold. The a-th antenna element 110a, the b-th antenna element 110b, the c-th antenna element 110c, and the d-th antenna element 110d may operate substantially identically to the dipole antenna element, and may transmit or receive a signal in a frequency band of about 28 GHz.

Figure 5B:
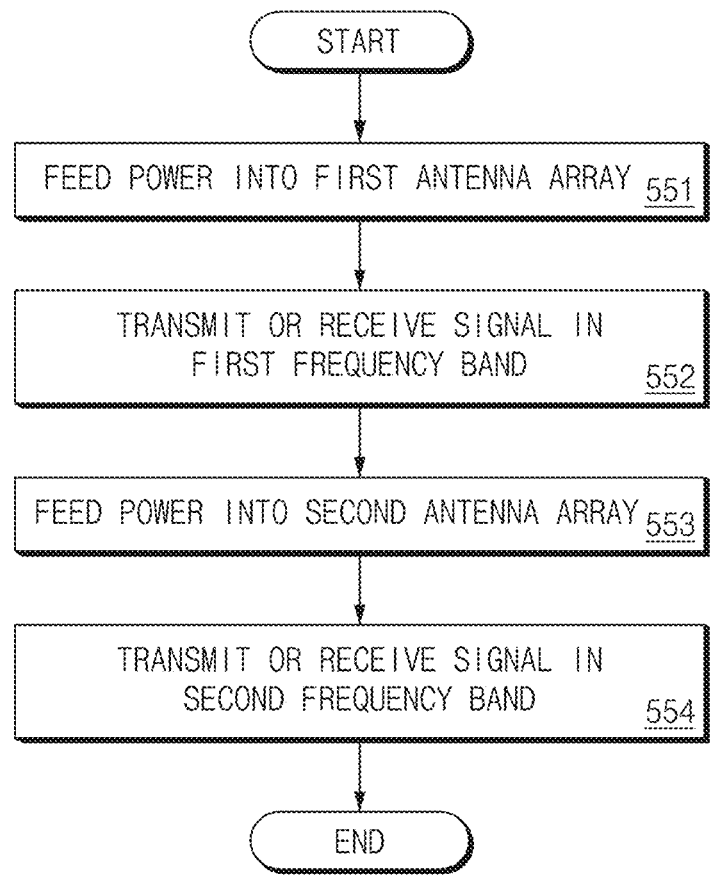
FIG. 5B is a flowchart illustrating the operation of an electronic device, according to an embodiment of the disclosure.

FIG. 5B is a flowchart illustrating the operation of an electronic device, according to an embodiment of the disclosure.

Referring to FIG. 5B, in operation 551, the communication circuit 113 may feed power into the first antenna array 110-1. In the disclosure, "power feeding" may refer to an operation for the communication circuit 113 applies current to the first antenna array 110-1 and/or the second antenna array 110-2 to transmit and receive various signals.

In operation 552, the communication circuit 13 may transmit and receive a signal in the first frequency band through the first antenna array 110-1. For example, the communication circuit 113 may transmit and receive a signal in a frequency band of about 28 GHz through the first antenna array 110-1.

In operation 553, the communication circuit 113 may feed power into the second antenna array 110-2. Although FIG. 5B illustrates that the communication circuit 113 feeds power into the second antenna array 110-2 after feeding power into the first antenna array 110-1, the communication circuit 113 may simultaneously feed power into the first antenna array 110-1 and the second antenna array 110-2. Alternatively, the communication circuit 113 may feed power into the first antenna array 110-1 after feeding power into the second antenna array 110-2.

In operation 554, the communication circuit 113 may transmit and receive a signal in the second frequency band through the second antenna array 110-2. The first frequency band and the second frequency band may be substantially the same. For example, the communication circuit 113 may transmit and receive a signal in a frequency band of about 28 GHz through the second antenna array 110-2. According to various embodiments, the communication circuit 113 performs the above operations by receiving a command from at least one processor electrically connected with the communication circuit 113 (e.g., a processor 1320 or a communication module 1390 of FIG. 13).

Figure 6:
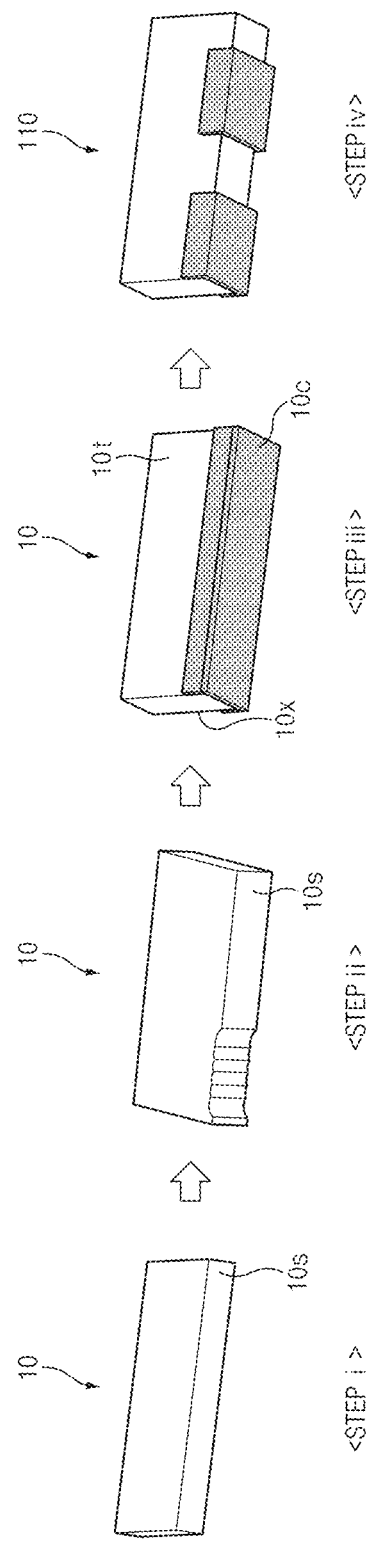
FIG. 6 illustrates a process of forming a first antenna array, according to an embodiment of the disclosure.

FIG. 6 illustrates a process of forming a first antenna array, according to an embodiment of the disclosure.

Referring to FIG. 6, in step i, a printed circuit board may be exposed through a side surface 10s of the antenna module 10.

In step ii, a portion of the side surface 10s of the antenna module 10 may be etched. For example, a plurality of holes may be formed in the side surface 10s of the antenna module 10 by a fine drill. When the plurality of holes are connected, the side surface 10s of the antenna module 10 may be flat.

In step iii, a portion of a first surface 10t, the side surface 10s, and a portion of a second surface 10x of the antenna module 10 may be plated with gold. Accordingly, a gold-plated area 10c may extend from one point of the first surface 10t to a point of the second surface 10x through the side surface 10s.

In step iv, the gold-plated area 10c may be cut out at regular distances. For example, the gold-plated area 10c may be cut out using a router. To perform the cutting process at distances shorter than the length which is able to be cut using the router, the gold-plated area 10c may be cut out using a laser. When the gold-plated area 10c is cut out at regular distances, a gold-plated portion is still present in an area which is not cut out, and the area which is not cut out may operate substantially identically as the dipolar antenna element 10a.

According to an embodiment of the disclosure, the dipole antenna array 10a disposed in the antenna module 10 may be removed, and a portion of the side surface 10s may be etched. The etched portion of the side surface may be plated with gold, and the gold-plated area 10c may be cut out at regular distances, thereby forming the first antenna module 110 according to an exemplary embodiment of the disclosure.

Figure 7:
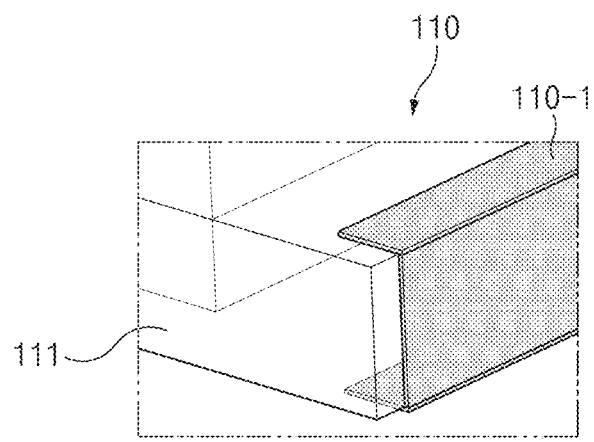
FIG. 7 is an enlarged view of a first antenna module, according to an embodiment.

FIG. 7 is an enlarged view illustrating a first antenna module, according to an embodiment.

Referring to FIG. 7, the thickness of the first antenna array 110-1 formed by plating gold on the side surface of the first antenna module 110 may be changed. For example, the thickness of the first antenna array 110-1 may be changed in the process of plating the first antenna array 110-1 with gold.

TABLE 1

| Thickness (μm) of First Antenna Array 110-1 | Gain (dB) of First Antenna Array 110-1 |
|---|---|
| 5 | 16.37 |
| 15 | 16.41 |
| 25 | 16.41 |

Table 1 shows a gain of the first antenna array 110-1 for each thickness of the first antenna array 110-1, according to an embodiment. Referring to Table 1, the gain of the first antenna array 110-1 may not be largely changed regardless of the thickness of the first antenna array 110-1. For example, although the thickness of the first antenna array 110-1 is gradually increased to about 5 μm, about 15 μm, and about 25 μm, the gain of the first antenna array 110-1 may be substantially the same.

Figure 8:
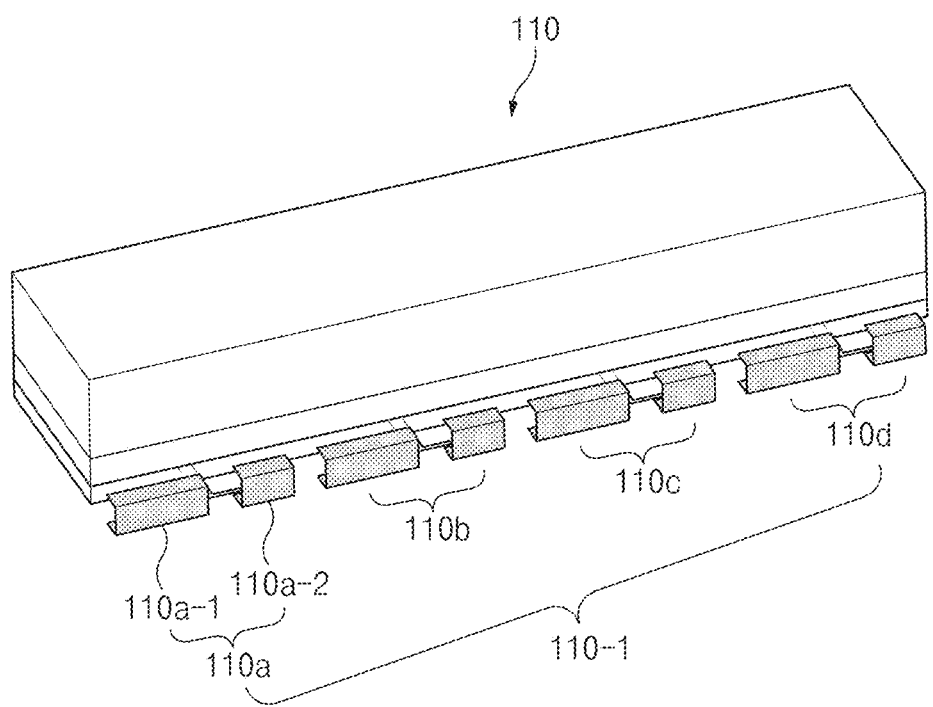
FIG. 8 is a side view of a first antenna module, according to an embodiment.

FIG. 8 is a side view of the first antenna module 110, according to an embodiment. FIG. 8 is a view illustrating the radiation performance of the first antenna array 110-1 when the first antenna elements 110a, 110b, 110c, and 110d have different cutting distances.

Referring to FIG. 8, the a-th antenna element 110a may include a first plated area 110a-1 and a second plated area 110a-2. The distance between the first plated area 110a-1 and the second plated area 110a-2 may be changed depending on the cutting manner described in step iv of FIG. 6. For example, in cutting out using a laser, the distance between the first plated area 110a-1 and the second plated area 110a-2 may be about 0.1 mm. For another example, in cutting out using a router, the distance between the first plated area 110a-1 and the second plated area 110a-2 may be about 0.8 mm.

According to an embodiment, the radiation performance of the a-th antenna element 110a may be changed depending on the distance between the first plated area 110a-1 and the second plated area 110a-2. For example, when the distance between the first plated area 110a-1 and the second plated area 110a-2 is increased from about 0.1 mm to about 0.8 mm, the gain of the a-th antenna element 110a may be reduced from about 10.97 dB to about 10.02 dB.

In the disclosure, the description of the a-th antenna element 110a will be identically applied to the b-th antenna element 110b, the c-th antenna element 110c, and the d-th antenna element 110d.

Figure 9:
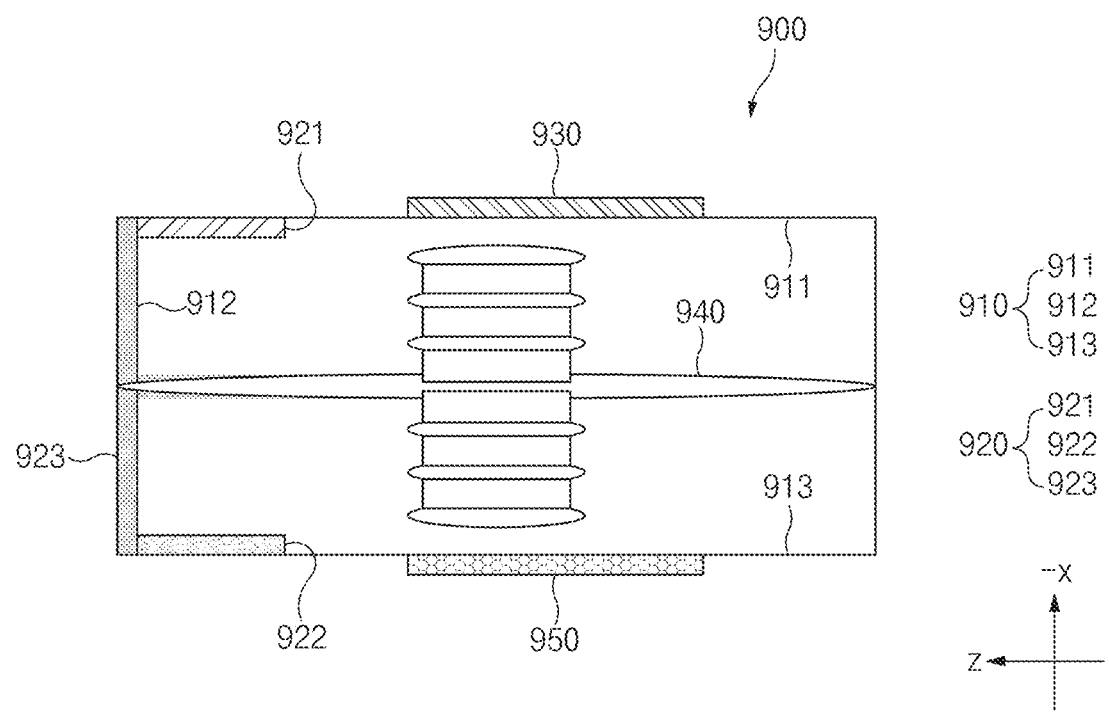
FIG. 9 is a cross-sectional view of a first antenna module, according to another embodiment.

FIG. 9 is a cross-sectional view of a first antenna module, according to another embodiment.

Referring to FIG. 9, a first antenna module 900 includes a printed circuit board 910, a first antenna array 920, a second antenna array 930, a power feeding line 940, and a communication circuit 950.

The printed circuit board 910 includes a first surface 911, a second surface 913 opposite to the first surface 911, and a side surface 912 between the first surface 911 and the second surface 913. For example, the side surface 912 may be formed to surround a space between the first surface 911 and the second surface 913.

The first antenna array 920 may include a first area 921, a second area 922 opposite to the first area 921, and a plated area 923. The first area 921 and the second area 922 may be a portion of a conductive layer (e.g., copper (Cu)) included in the printed circuit board 910. In other words, when the surface of the printed circuit board 910 is thinly cut out, the first area 921 and the second area 922 may be exposed through the first surface 911 and the second surface 913, respectively. The plated area 923 may be formed by plating gold on the side surface 912 of the printed circuit board 910. The plated area 923 may electrically connect the first area 921 with the second area 922, and the first area 921, the second area 922, and the plated area 923 may form the first antenna array 920.

The second antenna array 930 may be disposed on the first surface 911. The second antenna array 930 may be disposed on the second surface 913 or may be disposed inside the printed circuit board 910.

The power feeding line 940 may extend from the first antenna array 920 and the second antenna array 930 to be electrically connected with the communication circuit 950.

The communication circuit 950 may be disposed on a surface opposite to the surface on which the second antenna array 930 is disposed. For example, when the second antenna array 930 is disposed on the first surface 911, the communication circuit 950 may be disposed on the second surface 913. To the contrary, when the second antenna array 930 is disposed on the second surface 913, the communication circuit 950 may be disposed on the first surface 911.

The communication circuit 950 may transmit and receive a signal in a specific direction by feeding power into each of the first antenna array 920 and the second antenna array 930 through the power feeding line 940. For example, the communication circuit 950 may transmit and receive a signal in the z direction through the first antenna array 920 and may transmit and receive a signal in the −x direction through the second antenna array 930.

Figure 10:
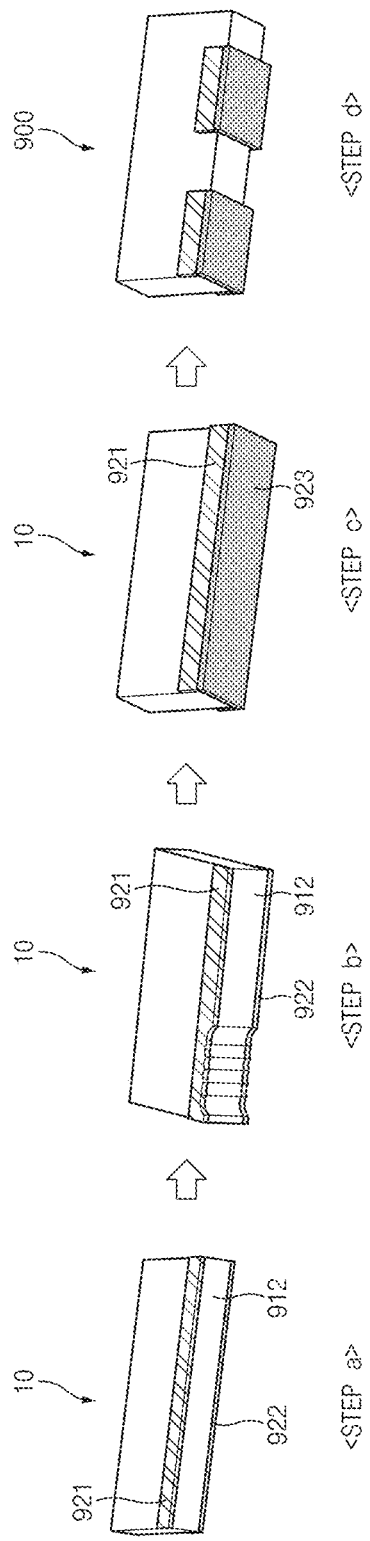
FIG. 10 illustrates a process of forming a first antenna module, according to another embodiment.

FIG. 10 illustrates a process of forming a first antenna module, according to another embodiment. FIG. 10 illustrates a process of forming the first antenna module 900 illustrated in FIG. 9.

Referring to FIG. 10, in step a, the dipole antenna array 10a may be removed from the antenna module 10. In addition, in step a, the surface of the antenna module 10 may be cut out to be thin. Accordingly, the first area 921 and the second area 922 may be exposed to the outside.

In step b, a portion of the side surface 912 of the antenna module 10 may be etched. For example, a plurality of holes may be formed in the side surface 912 of the antenna module through a fine drill. When the plurality of holes are connected, the side surface 912 of the antenna module 10 may be flat.

In step c, the side surface 912 of the antenna module 10 may be plated with gold. Accordingly, the plated area 923 may electrically connect the first area 921 with the second area 922.

In step d, the first area 921, the second area 922, and the plated area 923 may be cut out at regular distances. For example, the first area 921, the second area 922, and the plated area 923 may be cut out using a router. To perform the cutting process at distances shorter than the length which is able to be cut using the router, the first area 921, the second area 922, and the plated area 923 may cut out using a laser. When the first area 921, the second area 922, and the plated area 923 are cut out at regular distances, a conductive layer and a gold-plated portion are still present in an area which is not cut out, and the area which is not cut out may operate substantially identically as the dipolar antenna element.

Figure 11:
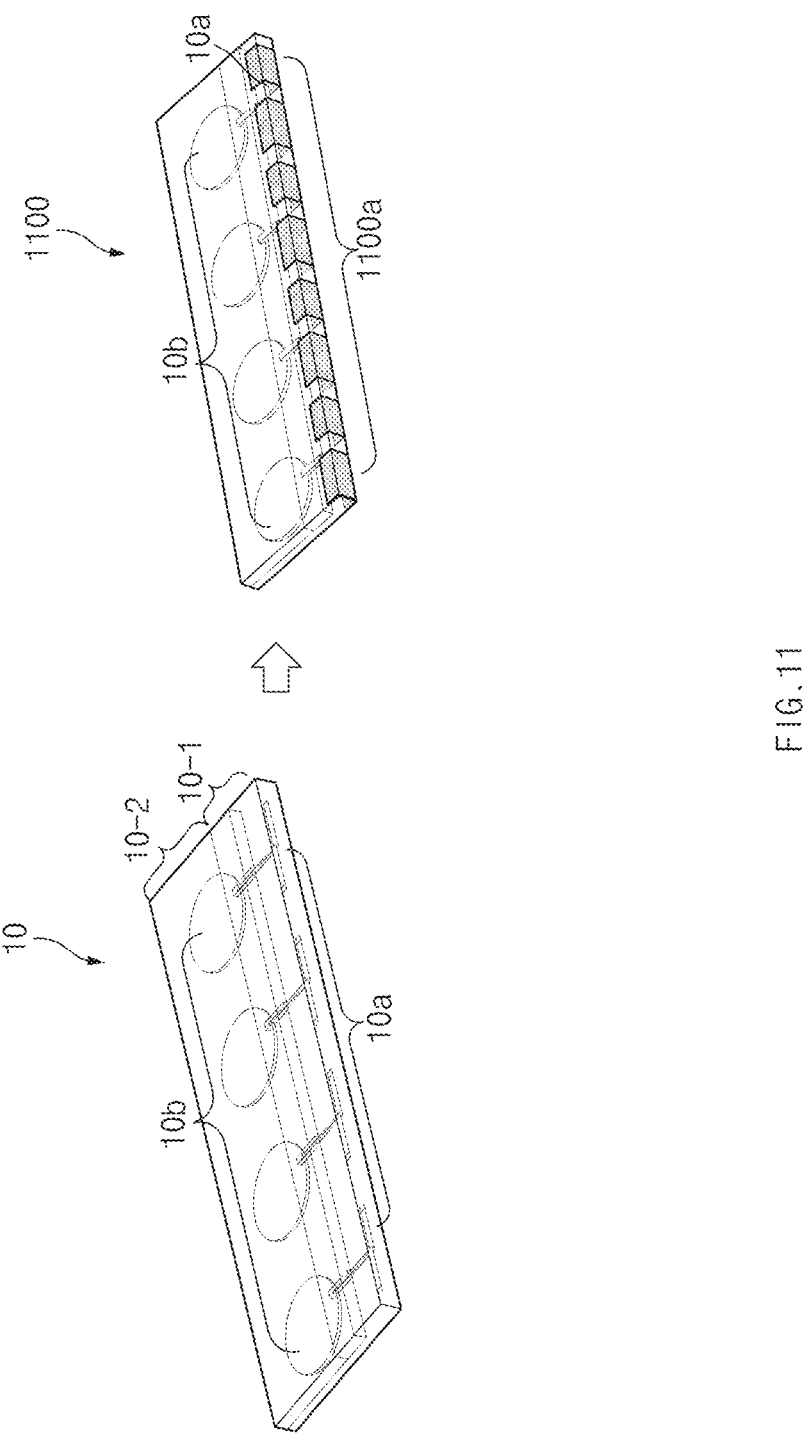
FIG. 11 illustrates an antenna module according to a comparative example, and illustrates a first antenna module according to another embodiment of the disclosure.

FIG. 11 illustrates an antenna module according to a comparative example, and illustrates the first antenna module 110 according to another embodiment of the disclosure.

Referring to FIG. 11, the antenna module 10 according to the comparative example may include the first area 10-1 and the second area 10-2. The first area 10-1 is an area for mounting the dipole antenna array 10a, and at least a portion of the first area 10-1 may be formed of a non-conductor (e.g., plastic). The second area 10-2 is an area for mounting the patch antenna array 110b, and a conductive layer and various wires may be disposed in the second area 10-2. The antenna module 10 according to the comparative example may transmit and receive a signal by feeding power into the dipole antenna array 10a and the patch antenna array 10b.

The first antenna module 110 according to an embodiment of the disclosure may include the dipole antenna array 10a, the patch antenna array 10b, and a director 1100a. The director 1100a may refer to a gold-plated component in an area in which the dipole antenna array 10a is disposed. The director 1100a may have the shape of "U" to surround the dipole antenna array 10a.

The first antenna module 110 according to an embodiment of the disclosure may transmit and receive a signal in a specified frequency band by feeding power into the dipole antenna array 10a. When the dipole antenna array 10a transmits and receives the signal, the director 1100a may aggregate the signal, thereby improving the radiation performance of the dipole antenna array 10a. In the disclosure, the director 1100a may be referred to as an agglomerator.

Figure 12:
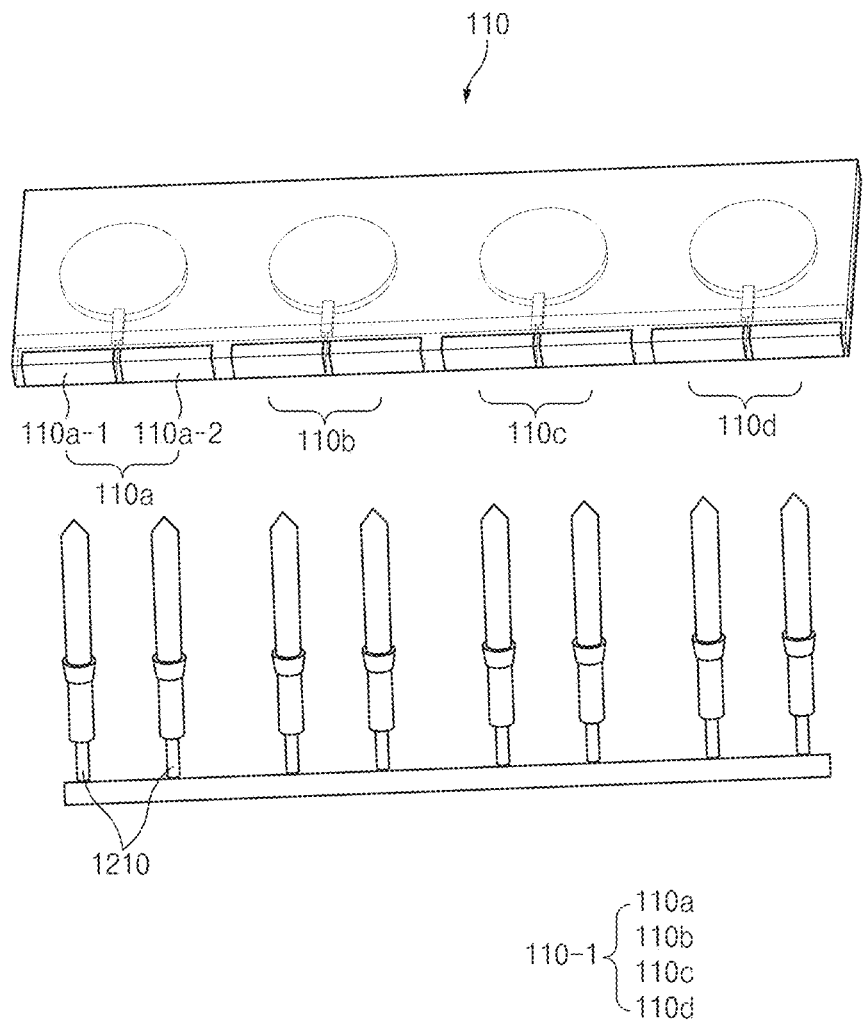
FIG. 12 illustrates a first antenna module according to another embodiment of the disclosure.

FIG. 12 illustrates a first antenna module according to another embodiment of the disclosure.

According to an embodiment of the disclosure, whether various components included in the first antenna module 110 are abnormal may be detected using the first antenna array 110-1. For example, the first antenna array 110-1 may be electrically connected with the power feeding line 112 and the communication circuit 113 included in the first antenna module 110. In addition, the first antenna array 110-1 is exposed to the outside of the first antenna module 110, so the first antenna array 110-1 may be directly connected with a probe 1210. A user may detect whether the power feeding line 112 and/or the communication circuit 113 connected with the first antenna array 110-1 is abnormal, by using the probe 1210.

According to an embodiment, a signal may be applied to any one of the first plated area 110a-1 and the second plated area 110a-2 in the a-th antenna elements 110a, and a remaining one of the first plated area 110a-1 and the second plated area 110a-2 may be grounded. The probe 1210 may be connected with the first plated area 110a-1 and the second plated area 110a-2 to measure transmission/reception performance of the a-th antenna element 110a. According to an embodiment of the disclosure, whether parts included in the first antenna module 110 are abnormal may be detected by using the first antenna array 110-1 exposed to the outside of the first antenna module 110, without a separate test pad or OTA (over the air) measurement setup. In the disclosure, the description of the a-th antenna element 110a may be identically applied to the b-th antenna element 110b, the c-th antenna element 110c, and the d-th antenna element 110d.

According to an embodiment of the disclosure, an electronic device may include a housing, and a plurality of antenna modules disposed to be adjacent to an edge of the housing. The plurality of antenna modules may include a printed circuit board including a first surface, a second surface opposite to the first surface, and a side surface between the first surface and the second surface, a first antenna array including a plurality of first antenna elements extending from a point on the first surface to a point on the second surface through the side surface, a second antenna array disposed on the first surface and including a plurality of second antenna elements, a power feeding line extending from the first antenna array and the second antenna array, and a communication circuit electrically connected with the power feeding line and configured to transmit and receive a signal in a specified frequency band by using the first antenna array and the second antenna array. The plurality of first antenna elements may be plated on the printed circuit board.

According to an embodiment of the disclosure, the communication circuit may be disposed on the second surface, and may be configured to transmit and receive a signal in a band ranging from 3 GHz to 100 GHz.

According to an embodiment of the disclosure, shapes of the first antenna elements may correspond to a shape of a dipole antenna element, and the second antenna elements may be patch antenna elements.

According to an embodiment of the disclosure, the communication circuit may be configured to transmit and receive the signal in a direction perpendicular to the side surface through the first antenna array.

According to an embodiment of the disclosure, the communication circuit may be configured to transmit and receive the signal in a direction perpendicular to the first surface through the second antenna array.

According to an embodiment of the disclosure, the printed circuit board may include a first area, in which a conductive layer is not disposed, and a second area in which the conductive layer is disposed, and the first antenna array may be formed on the first area.

According to an embodiment of the disclosure, the plurality of antenna modules may include a first antenna module and a second antenna module, the first antenna module may be disposed such that a second antenna array included in the first antenna module faces the edge of the housing, and the second antenna module may be disposed such that a first antenna array included in the second antenna module faces the edge of the housing.

According to an embodiment of the disclosure, the plurality of antenna modules may further include a third antenna module, and the third antenna module may be disposed such that a second antenna array included in the third antenna module faces the edge of the housing.

According to an embodiment of the disclosure, the housing may include a first edge, a second edge parallel to the first edge, a third edge connected with one end of the first edge and one end of the second edge, and a fourth edge connected with an opposite end of the first edge and an opposite end of the second edge, and the first antenna module to the third antenna module may be disposed to be adjacent to mutually different edges among the first edge to the fourth edge.

According to an embodiment of the disclosure, a distance between the first antenna array and the second antenna array may be equal to or greater than a specified value.

According to an embodiment of the disclosure, an electronic device may include a housing and a plurality of antenna modules disposed to be adjacent to an edge of the housing. The plurality of antenna modules may include a printed circuit board including a first area and a second area extending from the first area, a first antenna array disposed inside the first area, a second antenna array disposed on a surface of the second area, a director plated to surround the first antenna array on the first area, a power feeding line extending from the first antenna array and the second antenna array, and a communication circuit electrically connected with the power feeding line and configured to transmit or receive a signal in a specified frequency band by using the first antenna array and the second antenna array.

According to an embodiment of the disclosure, the first area may include a non-conductive material, and the second area may include at least one conductive layer.

According to an embodiment of the disclosure, the first area may include a first surface, a second surface facing the first surface, and a side surface between the first surface and the second surface. The director may extend from one point of the first surface to one point on the second surface through the side surface.

According to an embodiment of the disclosure, the communication circuit may be disposed inside the antenna module or on the surface of the antenna module and may be configured to transmit or receive a signal in a band ranging from 3 GHz to 100 GHz.

According to an embodiment of the disclosure, the first antenna array may correspond to a dipole antenna array, and the second antenna array may correspond to a patch antenna array.

According to an embodiment of the disclosure, an antenna module may include a printed circuit board, a first patch antenna and a second patch antenna formed on one surface of the printed circuit board, a communication circuit disposed on the one surface or another surface of the printed circuit board, a first signal line and a second signal line formed inside the printed circuit board while being electrically connected with the communication circuit, and at least partially exposed to an outside through a side surface of the printed circuit board, and a first conductive member coated on the side surface to make contact with the first signal line, and a second conductive member coated on the side surface to make contact with the second signal line.

According to an embodiment of the disclosure, the communication circuit may be connected with the first conductive member and the second conductive member through the first signal line and the second signal line, and configured to transmit and receive a signal in a specified frequency band in a direction perpendicular to the side surface.

According to an embodiment of the disclosure, the communication circuit may be connected to the first patch antenna and the second patch antenna through the first signal line and the second signal line, and configured to transmit and receive a signal in a specified frequency band in a direction perpendicular to the one surface.

According to an embodiment of the disclosure, the first conductive member and the second conductive member may be coated from one point on the one surface to one point on the another surface through the side surface.

According to an embodiment of the disclosure, the printed circuit board may include a plurality of layers, and at least one of the plurality of layers may include a conductive layer.

Figure 13:
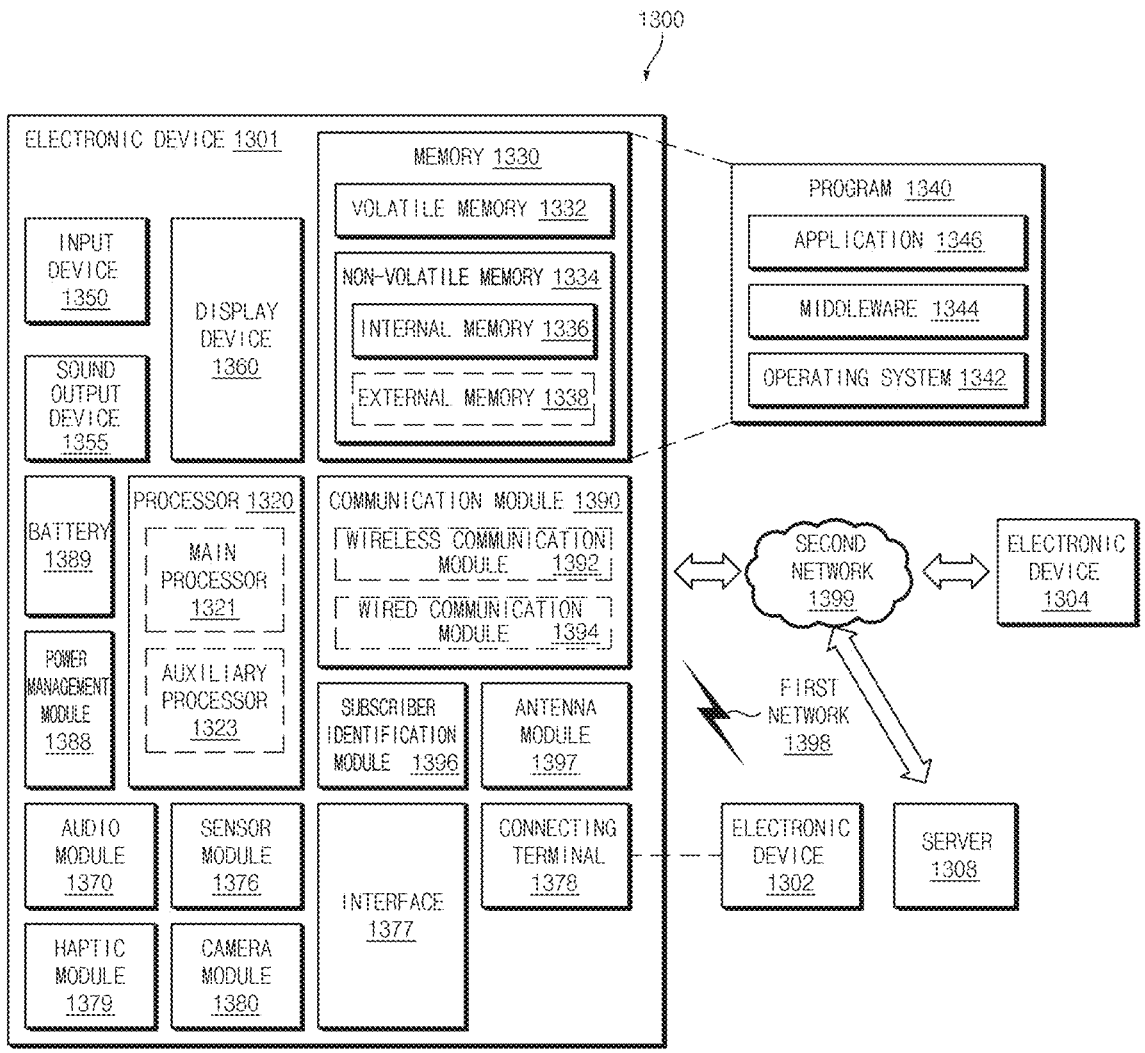
FIG. 13 is a block diagram of an electronic device in a network environment, according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

Figure 14:
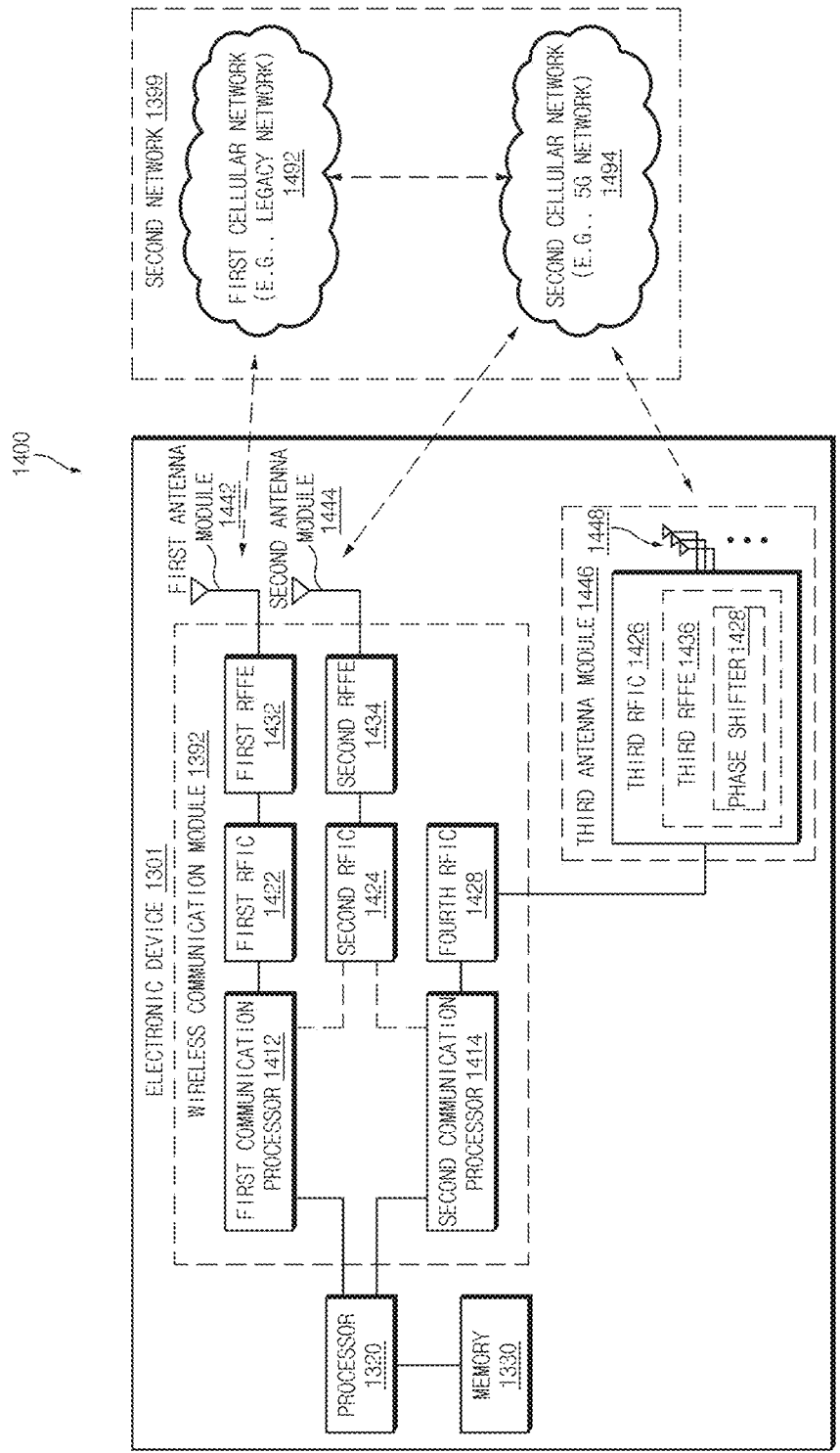
FIG. 14 is a block diagram of an electronic device in a network environment including a plurality of cellular networks, according to various embodiments.

FIG. 14 is a block diagram of an electronic device in a network environment including a plurality of cellular networks, according to various embodiments.

Referring to FIG. 14, the electronic device 1301 may include a first communication processor 1412, a second communication processor 1414, a first radio frequency integrated circuit (RFIC) 1422, a second RFIC 1424, a third RFIC 1426, a fourth RFIC 1428, a first radio frequency front end (RFFE) 1432, a second RFFE 1434, a first antenna module 1442, a second antenna module 1444, and an antenna 1448. The electronic device 1301 may further include the processor 1320 and the memory 1330. The second network 1399 may include a first cellular network 1492 and a second cellular network 1494. According to another embodiment, the electronic device 1301 may further include at least one of components illustrated in FIG. 13, and the second network 1399 may further include at least another network. According to an embodiment, the first communication processor 1412, the second communication processor 1414, the first RFIC 1422, the second RFIC 1424, the fourth RFIC 1428, the first RFFE 1432, and the second RFFE 1434 may form at least a portion of the wireless communication module 1392. According to another embodiment, the fourth RFIC 1428 may be omitted or included as a part of the third RFIC 1426.

The first communication processor 1412 may support establishment of a communication channel of a band to be used for wireless communication with the first cellular network 1492 and may support communication of a legacy network through the established communication channel. According to various embodiments, the first cellular network may be a legacy network including a second generation (2G), 3G, 4G, or long term evolution (LTE) network. The second communication processor 1414 establishes a communication channel corresponding to a specified band (e.g., about 6 GHz to about 60 GHz) of bands to be used for wireless communication with the second cellular network 1494, and a 5G network through the established communication channel. According to various embodiments, the second cellular network 1494 may be a 5G network defined by 3GPP. In addition, according to an embodiment, the first communication processor 1412 or the second communication processor 1414 may support the establishment of a communication channel to be used in another specified band (e.g., about 6 GHz or less) of bands to be used for wireless communication with the second cellular network 1494, and may support 5G network communication through the established communication channel. According to an embodiment, the first communication processor 1412 and the second communication processor 1414 may be implemented in a single chip or a single package. According to various embodiments, the first communication processor 1412 or the second communication processor 1414 may be implemented in a single chip or a single package together with the processor 1320, the auxiliary processor 1323, or the communication module 1390. According to an embodiment, the first communication processor 1412 and the second communication processor 1414 may be directly or indirectly connected with each other through an interface (not illustrated) to send or receive data or a control signal in any one direction or in a bi-direction.

The first RFIC 1422 may convert a baseband signal, which is generated by the first communication processor 1412, into a radio frequency (RF) signal in the band of about 700 MHz to about 3 GHz used for the first cellular network 1492 (e.g., the legacy network), when transmitting a signal. The first RFIC 1422 may obtain an RF signal from the first cellular network 1492 (e.g., the legacy network) through the antenna (e.g., the first antenna module 1442) and may preprocess the RF signal through an RFFE (e.g., the first RFFE 1432), when receiving the signal. The first RFIC 1422 may convert the preprocessed RF signal into the baseband signal such that the preprocessed RF signal is processed through the first communication processor 1412.

The second RFIC 1424 may convert a baseband signal generated by the first communication processor 1412 or the second communication processor 1414 into an RF signal (hereinafter, a 5G Sub6 RF signal) of the Sub6 band (e.g., less than about 6 GHz) used for the second cellular network 1494 (e.g., 5G network), when transmitting the signal. The second RFIC 1424 may obtain a 5G Sub6 RF signal from the second cellular network 1494 (e.g., a 5G network) through an antenna (e.g., the second antenna module 1444), and may preprocess the 5G Sub6 RF signal through an RFFE (e.g., the second RFFE 1434), when receiving a signal. The second RFIC 1424 may convert the preprocessed 5G Sub6 RF signal into a baseband signal to be processed by a corresponding one of the first communication processor 1412 or the second communication processor 1414.

The third RFIC 1426 (e.g., the communication circuit 113) may convert a baseband signal generated by the second communication processor 1414 into an RF signal (hereinafter, a 5G Above6 RF signal) of a 5G Above6 band (e.g., in the range of about 6 GHz to about 60 GHz) to be used for the second cellular network 1494 (e.g., 5G network), when transmitting the signal. The third RFIC 1426 may obtain a 5G Above6 RF signal from the second cellular network 1494 (e.g., a 5G network) through an antenna (e.g., the antenna 1448), and may preprocess the 5G Above6 RF signal through a third RFFE 1436, when receiving the signal. The third RFIC 1426 may convert the preprocessed 5G Above6 RF signal into a baseband signal to be processed by the second communication processor 1414. According to an embodiment, the third RFFE 1436 may be formed as a portion of the third RFIC 1426.

According to an embodiment, the electronic device 1301 may further include the fourth RFIC 1428 separately from the third RFIC 1426, or as at least a portion of the third RFIC 1426. In this case, the fourth RFIC 1428 may convert a baseband signal generated by the second communication processor 1414 into an RF signal (hereinafter, an IF signal) in an intermediate frequency band (e.g., the band of about 9 GHz to about 11 GHz) and then may transmit the IF signal to the third RFIC 1426. The third RFIC 1426 may convert the IF signal into the 5G Above6 RF signal. The third RFIC 1426 may receive a 5G Above6 RF signal from the second cellular network 1494 (e.g., the 5G network) through an antenna (e.g., the antenna 1448) and may convert 5G Above6 RF signal to an IF signal. The fourth RFIC 1428 may convert the IF signal to a baseband signal such that the baseband signal is processed by the second communication processor 1414.

According to an embodiment, the first RFIC 1422 and the second RFIC 1424 may be implemented as a single chip or at least a portion of a single package. According to an embodiment, the first RFFE 1432 and the second RFFE 1434 may be implemented as a single chip or at least a portion of a single package. According to an embodiment, at least one antenna module of the first antenna module 1442 or the second antenna module 1444 may be omitted or may be coupled to another antenna module to process RF signals in a plurality of corresponding bands.

According to an embodiment, the third RFIC 1426 and the antenna 1448 may be disposed on the same substrate to form a third antenna module 1446. For example, the wireless communication module 1392 or the processor 1320 may be disposed on the first substrate (e.g., the main PCB). In this case, the third RFIC 1426 is disposed in a partial area (e.g., a bottom surface) of a second substrate (e.g., a sub PCB) separate from the first substrate and the antenna 1448 is disposed on another partial area of the second substrate, such that the third antenna module 1446 (e.g., the antenna module 110) is formed. As the third RFIC 1426 and the antenna 1448 are disposed on the same substrate, the length of a transmission line between the third RFIC 1426 and the antenna 1448 may be reduced. Accordingly, for example, a signal in a high-frequency band (e.g., ranging from about 6 GHz to about 60 GHz) used for the 5G network communication may be prevented from being lost (e.g., attenuated) due to the transmission line. Accordingly, the electronic device 1301 may improve the quality or the speed in the communication with the second cellular network 1494 (e.g., the 5G network).

According to an embodiment, the antenna 1448 may be formed in the form of an antenna array including a plurality of antenna elements which is usable for beam forming. In this case, the third RFIC 1426 may include, for example, a plurality of phase shifters 1438 corresponding to a plurality of antenna elements serving as a portion of the third RFFE 1436. Each of the plurality of phase shifters 1438 may convert the phase of the 5G Above6 RF signal to be transmitted to the outside (e.g., a base station of the 5G network) of the electronic device 1301 through a corresponding antennal element, when transmitting a signal. The plurality of phase shifters 1438 may convert the phases of the 5G Above6 RF signals, which are received from the outside, to be equal to each other or substantially equal to each other through corresponding antennal elements, when receiving a signal. This allows the electronic device 1301 to transmit or receive a signal through the beam forming with the outside.

The second cellular network 1494 (e.g., the 5G network) may be operated independently from the first cellular network 1492 (e.g., a legacy network) (e.g., Stand-Alone (SA)), or may be operated in link to the first cellular network 1492 (e.g., Non-Stand Alone (NSA)). For example, in a 5G network, only an access network (e.g., 5G radio access network (RAN) or next generation RAN (NG RAN)) may be present and a core network (e.g., next generation core (NGC)) may be absent. In this case, the electronic device 1301 may access the access network of the 5G network, and then may access the external network (e.g., the Internet) under the control of the core network (e.g., the evolved packed core (EPC)) of the legacy network. The protocol information (e.g., LTE protocol information) for communication with the legacy network or protocol information (e.g., New Radio (NR) protocol information) for communication with the 5G network may be stored in the memory 1330 to be accessed by another part (e.g., the processor 1320, the first communication processor 1412, or the second communication processor 1414)).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a housing; and
    a plurality of antenna modules disposed to be adjacent to an edge of the housing,
    wherein the plurality of antenna modules includes:
    a printed circuit board including a first surface, a second surface opposite to the first surface, and a side surface between the first surface and the second surface;
    a first antenna array including a plurality of first antenna elements;
    a second antenna array disposed on the first surface and including a plurality of second antenna elements; and
    a communication circuit electrically connected with the first antenna array and the second antenna array and configured to transmit and receive a signal in a specified frequency band by using the first antenna array and the second antenna array,
    wherein at least one of the plurality of first antenna elements of the first antenna array include a first area, a second area opposite to the first area, and a third area,
    wherein the first area is formed on the first surface and extending to the side surface,
    wherein the second area is formed on the second surface and extending to the side surface,
    wherein the third area is formed on the side surface and connected to the first area and the second area,
    wherein the first area, the second area and third area are plated on the printed circuit board, and
    wherein the first antenna elements are dipole antenna elements, and wherein the second antenna elements are patch antenna elements.

2. The electronic device of claim 1, wherein the communication circuit is disposed on the second surface, and is configured to transmit and receive a signal in a band ranging from 3 GHz to 100 GHz.

3. The electronic device of claim 1, wherein the communication circuit is configured to:
    transmit and receive the signal in a direction perpendicular to the side surface through the first antenna array.

4. The electronic device of claim 1, wherein the communication circuit is configured to:
    transmit and receive the signal in a direction perpendicular to the first surface through the second antenna array.

5. The electronic device of claim 1, wherein the printed circuit board includes:
    the first area, in which a conductive layer is not disposed, and the second area in which the conductive layer is disposed, and
    wherein the first antenna array is formed on the first area.

6. The electronic device of claim 1, wherein the plurality of antenna modules include:
    a first antenna module and a second antenna module;
    wherein the first antenna module is disposed such that the second antenna array included in the first antenna module faces the edge of the housing, and
    wherein the second antenna module is disposed such that the first antenna array included in the second antenna module faces the edge of the housing.

7. The electronic device of claim 6, wherein the plurality of antenna modules further include:
    a third antenna module,
    wherein the third antenna module is disposed such that the second antenna array included in the third antenna module faces the edge of the housing.

8. The electronic device of claim 7, wherein the housing includes a first edge, a second edge parallel to the first edge, a third edge connected with one end of the first edge and one end of the second edge, and a fourth edge connected with an opposite end of the first edge and an opposite end of the second edge, and
    wherein the first antenna module to the third antenna module are disposed to be adjacent to mutually different edges among the first edge to the fourth edge.

9. The electronic device of claim 1, wherein a distance between the first antenna array and the second antenna array is equal to or greater than a specified value.

\* \* \* \* \*